United States Patent
Bumb et al.

(10) Patent No.: US 12,059,649 B2
(45) Date of Patent: Aug. 13, 2024

(54) SOLVENT AND PROCESS FOR REMOVING CARBON DIOXIDE FROM A GASEOUS MIXTURE HAVING HIGH CARBON DIOXIDE PARTIAL PRESSURES

(71) Applicant: CARBON CLEAN SOLUTIONS LIMITED, Reading (GB)

(72) Inventors: Prateek Bumb, London (GB); James Jonathan Hall, London (GB); Gopi Neeliesetty, Bangalore (IN); Rachel Bailey, Hampshire (GB)

(73) Assignee: CARBON CLEAN SOLUTIONS LIMITED, Reading (GB)

( * ) Notice: Subject to any disclaimer, the term of this patent is extended or adjusted under 35 U.S.C. 154(b) by 630 days.

(21) Appl. No.: 17/255,403

(22) PCT Filed: Jun. 24, 2019

(86) PCT No.: PCT/GB2019/051774
§ 371 (c)(1),
(2) Date: Dec. 22, 2020

(87) PCT Pub. No.: WO2020/002892
PCT Pub. Date: Jan. 2, 2020

(65) Prior Publication Data
US 2021/0308619 A1   Oct. 7, 2021

(30) Foreign Application Priority Data

Jun. 26, 2018 (IN) .............................. 201811023872
Jul. 2, 2018 (IN) .............................. 201811024582
Aug. 24, 2018 (GB) ...................................... 1813839

(51) Int. Cl.
*B01D 53/14* (2006.01)

(52) U.S. Cl.
CPC ..... *B01D 53/1493* (2013.01); *B01D 53/1425* (2013.01); *B01D 53/1462* (2013.01);
(Continued)

(58) Field of Classification Search
None
See application file for complete search history.

(56) References Cited

U.S. PATENT DOCUMENTS 5,766,548 A   6/1998   Soria
6,500,397 B1   12/2002   Yoshida et al.
(Continued)

FOREIGN PATENT DOCUMENTS

CN   1110624 A   10/1995
CN   102652033 A   8/2012
(Continued)

OTHER PUBLICATIONS

Li et al. (2013, Characterization of piperazine/2-aminomethylpropanol for carbon dioxide capture. Energy Procedia, 37, 340-352) (Year: 2013).*
(Continued)

*Primary Examiner* — Gabriel E Gitman
(74) *Attorney, Agent, or Firm* — Bryan D. Zerhusen, Esq.; Nicholas R. Herrel, Esq.; CANTOR COLBURN LLP

(57) ABSTRACT

The present invention relates to an absorption solvent and, more particularly, to an absorption solvent for removing carbon dioxide from a gaseous mixture having high carbon dioxide partial pressure.

9 Claims, 2 Drawing Sheets

(52) U.S. Cl.
CPC .................. *B01D 53/1487* (2013.01); *B01D 2252/20415* (2013.01); *B01D 2252/20442* (2013.01); *B01D 2252/20447* (2013.01); *B01D 2252/20478* (2013.01); *B01D 2252/504* (2013.01); *B01D 2256/16* (2013.01); *B01D 2256/20* (2013.01); *B01D 2256/245* (2013.01); *B01D 2257/304* (2013.01); *B01D 2257/306* (2013.01); *B01D 2257/504* (2013.01)

(56) References Cited

U.S. PATENT DOCUMENTS

| | | | |
|---|---|---|---|
| 9,908,085 | B2 | 3/2018 | Parisi |
| 2007/0148068 | A1 | 6/2007 | Burgers et al. |
| 2007/0148069 | A1 | 6/2007 | Chakravarti et al. |
| 2008/156190 | A1* | 7/2008 | Lutz .............. B01J 20/18 95/148 |
| 2009/0199713 | A1 | 8/2009 | Asprion et al. |
| 2011/0303088 | A1 | 12/2011 | Dutra E Mello et al. |
| 2012/0285319 | A1 | 11/2012 | Omole et al. |
| 2013/0319235 | A1 | 12/2013 | Wolf et al. |
| 2014/0178278 | A1* | 6/2014 | Siskin .............. B01D 53/62 423/228 |
| 2015/0083576 | A1 | 3/2015 | Aboudheir et al. |
| 2015/0139879 | A1* | 5/2015 | Giroudiere .......... B01D 53/96 423/210 |
| 2016/0193563 | A1 | 7/2016 | Bumb |
| 2017/0157554 | A1 | 6/2017 | Yu et al. |
| 2017/0173517 | A1 | 6/2017 | Wong et al. |
| 2017/0274317 | A1 | 9/2017 | Bumb |
| 2018/0001255 | A1* | 1/2018 | Bumb .............. B01D 53/1425 |
| 2018/0236437 | A1 | 8/2018 | Tan et al. |
| 2018/0280871 | A1 | 10/2018 | Verma et al. |
| 2018/0361312 | A1 | 12/2018 | Dutra e Mello et al. |

FOREIGN PATENT DOCUMENTS

| | | |
|---|---|---|
| CN | 103153433 A | 6/2013 |
| CN | 104411806 A | 3/2015 |
| CN | 105307752 A | 2/2016 |
| CN | 107106967 A | 8/2017 |
| EP | 0558019 A2 | 9/1993 |
| GB | 2541399 A | 2/2017 |
| JP | 1986278336 A | 12/1986 |
| JP | 05301024 A | 11/1993 |
| JP | 08257355 A | 10/1996 |
| JP | 2009521313 A | 6/2009 |
| JP | 2014113544 A | 6/2014 |
| JP | 2016129877 A | 7/2016 |
| JP | 2017533090 A | 11/2017 |
| TW | I619540 B | 4/2018 |
| WO | WO 2012107429 A1 | 8/2012 |
| WO | WO 2014/099241 A2 | 6/2014 |
| WO | WO 2014/118633 A2 | 8/2014 |
| WO | 2016027164 A1 | 2/2016 |
| WO | WO 2016/057499 A1 | 4/2016 |
| WO | WO 2016154753 A1 | 10/2016 |

OTHER PUBLICATIONS

International Search Report and Written Opinion for International Patent Application Serial No. PCT/GB2019/051774, mailed on Sep. 2, 2019.

Bougie, Francis, et al., Analysis of the regeneration of monoethanolamine aqueous solutions by microwave irradiation, Energy Procedia, Elsevier, NL, vol. 142, Jan. 31, 2018, pp. 3661-3666.

McGurk, Stephen, J., et al., Microwave swing regeneration of aqueous monoethanolamine for post-combustion CO2 capture, Applied Energy, Elsevier Science Publishers, GB, vol. 192, Feb. 14, 2017, pp. 126-133.

Samanta, Arunkumar, et al., Absorption of carbon dioxide into aqueous solutions of piperazine activated 2-amino-2-methyl-1-propanol, Chemical Engineering Science 64 (2009) 1185-1194.

Li, Han, et al., Characterization of Piperazine/2-Aminomethylpropanol for Carbon Dioxide Capture, Energy Procedia 37 (2013) 340-352.

* cited by examiner

SOLVENT AND PROCESS FOR REMOVING CARBON DIOXIDE FROM A GASEOUS MIXTURE HAVING HIGH CARBON DIOXIDE PARTIAL PRESSURES

CROSS-REFERENCE TO RELATED APPLICATIONS

This application is a National Stage of PCT/GB2019/051774, filed 24 Jun. 2019, titled SOLVENT AND PROCESS FOR REMOVING CARBON DIOXIDE FROM A GASEOUS MIXTURE HAVING HIGH CARBON DIOXIDE PARTIAL PRESSURES, published as International Patent Application Publication No. WO 2020/002892, which claims the benefit and priority to UK Patent Application No. 1813839.6, filed on 24 Aug. 2018, and Indian Patent Application No. 201811024582, filed 2 Jul. 2018, and Indian Patent Application No. 201811023872, filed 26 Jun. 2018, each of which is incorporated herein by reference in their entirety for all purposes.

DESCRIPTION OF INVENTION

Field of Technology

The present invention relates to an absorption solvent and, more particularly, to an absorption solvent for removing carbon dioxide from a gaseous mixture having high carbon dioxide partial pressure.

BACKGROUND OF THE INVENTION

The purification of gaseous mixtures, and in particular the purification of hydrocarbon gaseous mixtures such as natural gas, which consists primarily of methane, or of synthesis gas, in order to remove contaminants and impurities from them is a common operation in industry. These impurities and contaminants are in particular the "acidic gases" such as for example carbon dioxide ($CO_2$) and hydrogen sulphide ($H_2S$); water, and certain hydrocarbons.

Generally, a solvent has its own advantages and disadvantages, for instance, properties such as loading capacity, kinetics, regeneration energy, selectivity, stability, corrosivity, etc. determine the operational performance of a solvent. This disclosure is directed to an improved solvent with unexpected properties.

SUMMARY OF THE INVENTION

The present invention relates to a solvent composition for partially or completely removing carbon dioxide gas from a feed gas stream by washing the gaseous stream with a solution containing a combination of chemical solvents. The present invention further relates to a process carried out in the presence of an alkanolamine compound in an amount of from 10 to 65 wt. % (or 20 to 50 wt. %), a selective activator (otherwise referred to as a polyamine) to promote the reaction kinetics in an amount of from 3 to 25 wt. %, the balance being water and unavoidable impurities. Additionally, the present disclosure relates to an absorbent liquid to be used in a purification process for the removal of acid gases.

Representative features of the present invention are set out in the following clauses, which stand alone or may be combined, in any combination, with one or more features disclosed in the text and/or figures of the specification.

The present invention is now described with reference to the following clauses:

1. A solvent for removing gases from a gaseous mixture comprising:
   a polyamine present in an amount from 3% to 25% by weight;
   a sterically hindered alkanolamine present in an amount from 10% to 65% by weight;
   the balance being water and unavoidable impurities.
2. The solvent of clause 1, wherein the polyamine is present in an amount from 5% to 15% by weight.
3. The solvent of clause 1 or clause 2, wherein the polyamine is present in an amount of: 5% by weight (±10%); or, 10% by weight (±10%); or, 15% by weight (±10%).
4. The solvent of any one of clauses 1 to 3, wherein the sterically hindered alkanolamine is present in an amount of: from 20% to 50% by weight; or, from 30% to 40% by weight.
5. The solvent of any one of clauses 1 to 4, wherein the sterically hindered alkanolamine is present in an amount of: 45% by weight (±10%); or, 40% by weight (±10%); or, 30% by weight (±10%); or, 25% by weight (±10%).
6. The solvent of any one of clauses 1 to 5, wherein the polyamine is: 2-piperazine-1-ethylamine (otherwise known as 2-piperazin-1-ylethanamine, amino ethyl piperazine or AEP); and/or, 1-(2-hydroxyethyl)piperazine; and/or, piperazine; and/or, 1,4-diaminocyclohexane; and/or, 4-aminopiperidine; and/or, 4-amino-1-piperidineethanol; and/or, 3-dimethylamino-1-propylamine; and/or, N-methylamino-1-propylamine; and/or, 3-diethylamino-1-propylamine; and/or, N-ethylamino-1-propylamine; optionally, wherein:
   the polyamine is 2-piperazine-1-ethylamine.
7. The solvent of any one of clauses 1 to 6, wherein the sterically hindered alkanolamine is: 2-amino-2-ethyl-1,3-propanediol (otherwise known as AEPD); and/or, 2-amino-2-hydroxymethyl-1,3-propanediol (otherwise known as AHPD); and/or, 2-amino-2-methyl-1-propanol; and/or, 2-amino-2-methyl-1,3-propanediol (otherwise known as AMPD); and/or, 2-methylamino-2-ethyl-1,3-propanediol (otherwise known as MAEPD); and/or, 2-methylamino-2-hydroxymethyl-1,3-propanediol (otherwise known as MAHPD); and/or, 2-methylamino-2-methyl-1,3-propanediol (otherwise known as MAMPD); optionally, wherein:
   the sterically hindered alkanolamine is: 2-amino-2-ethyl-1,3-propanediol (otherwise known as AEPD); and/or, 2-amino-2-hydroxymethyl-1,3-propanediol (otherwise known as AHPD).
8. The solvent of any one of clauses 1 to 7, wherein the polyamine is 2-piperazine-1-ethylamine (otherwise known as amino ethyl piperazine or AEP) and the sterically hindered alkanolamine is 2-amino-2-hydroxymethyl-1,3-propanediol (otherwise known as AHPD).
9. The solvent of any one of clauses 1 to 8, wherein the polyamine is 2-piperazine-1-ethylamine (otherwise known as amino ethyl piperazine or AEP) and the sterically hindered alkanolamine is 2-amino-2-ethyl-1,3-propanediol (otherwise known as AEPD).
10. A process for removal of acid gases from a gaseous mixture comprising the steps of:
    obtaining a solvent, the solvent comprising: a polyamine present in an amount from 3% to 25% by weight; a sterically hindered alkanolamine present in an amount from 10% to 65% by weight; the balance being water and unavoidable impurities; optionally, the solvent having a temperature of from 30° C. to 65° C.; and applying the solvent to a gaseous mixture comprising one or more gases selected from the group consisting of: carbon dioxide, mercaptans, hydrogen sulphide, and carbonyl sulphide.

11. The process of clause 10, wherein the solvent is a solvent according to any one of clauses 1 to 9.
12. The process of clause 10 or clause 11, further comprising the step of: heating the gas absorbed solvent to a temperature of from 65° C. to 110° C.
13. The process of any one of clauses 10 to 12, further comprising the step of:
    loading the solvent into a regeneration column with at least carbon dioxide/acid gas at a regeneration pressure of from 0 bar to 5 bar and at a temperature of from 75° C. to 130° C.
14. The process of any one of clauses 10 to 13, further comprising the step of:
    heating the solvent to a temperature of from 105° C. to 130° C.
15. The process of any one of clauses 10 to 14, wherein the gaseous mixture comprises one or more gases present at less than 4 ppm.
16. The process of any one of clauses 10 to 15, further comprising the step of:
    a. reducing the concentration of carbon dioxide in the gaseous mixture to less than 100 ppm by volume; and/or,
    b. reducing the concentration of $H_2S$ in the treated gaseous mixture to less than 2 ppm by volume and reducing the concentration of carbon dioxide in the treated gaseous mixture to less than 50 ppm by volume; and/or,
    c. reducing the concentration of mercaptans in the treated gaseous mixture to less than 5 ppm by volume.
17. The process of any one of clauses 10 to 16, further comprising the step of: reducing a concentration of carbon dioxide in the gaseous mixture to less than 10 ppm.
18. The process of any one of clauses 10 to 17, wherein the gaseous mixture is a synthesis gas obtained from a process selected from the group consisting of: a coal gasification process, a steam reforming process, and a direct reduced iron process; each synthesis gas comprising one or more of carbon monoxide, carbon dioxide, hydrogen sulfide, carbonyl sulfide, hydrogen, nitrogen, and methane.
19. The process of any one of clauses 10 to 18, wherein the gaseous mixture is natural gas comprising methane.

BRIEF DESCRIPTION OF THE DRAWINGS

The features, nature, and advantages of the present disclosure will become more apparent from the detailed description set forth below when taken in conjunction with the figures.

DETAILED DESCRIPTION OF THE INVENTION

Figure 1:
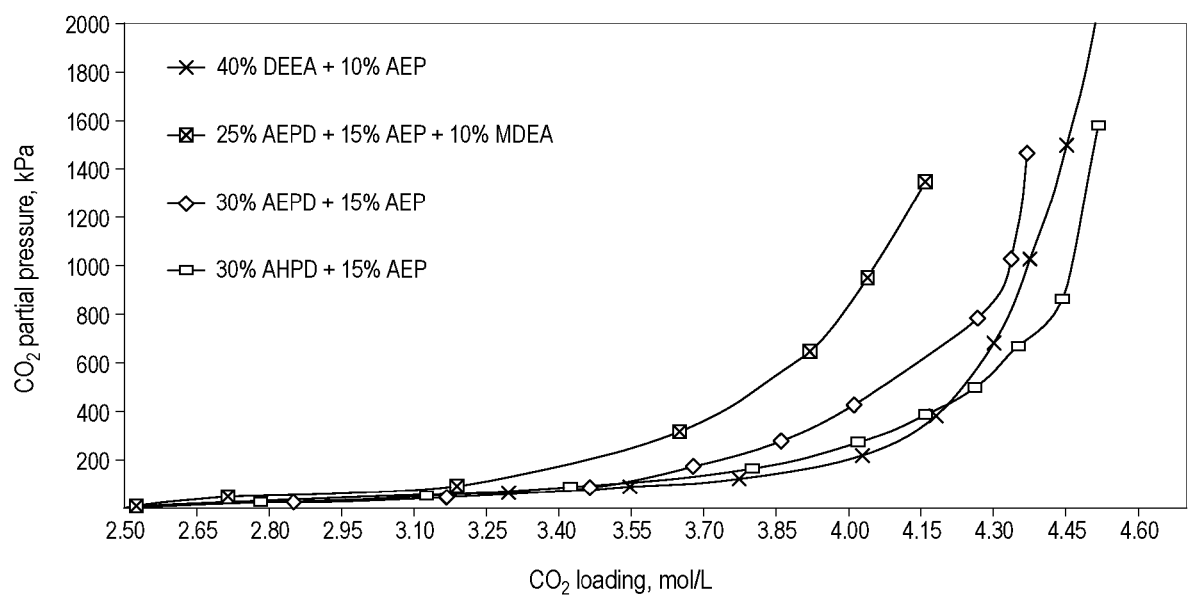
FIG. 1 illustrates a graph showing vapor liquid equilibrium (VLE) relationship between partial pressure of $CO_2$ in the vapor phase and the loading (i.e. concentration) of $CO_2$ in a solvent at 40° C.

The following description and examples illustrate various embodiments of the present disclosure in detail. Those of skill in the art will recognize that there are numerous variations and modifications of this disclosure that are encompassed by its scope. Accordingly, the description of the disclosed embodiments should not be deemed to limit the scope of the present disclosure.

Some examples of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an", and "the" include plural references unless the context clearly dictates otherwise.

Examples of the present disclosure will be described more fully hereinafter with reference to the accompanying figures in which examples are shown. Examples of the claims may, however, be embodied in many different forms and should not be construed as limited to the examples set forth herein. The examples set forth herein are non-limiting examples and are merely examples among other possible examples.

Definitions

Unless defined otherwise, all technical and scientific terms used herein have the same meaning as is commonly understood by one of ordinary skill in the art. All patents, applications, published applications and other publications referenced herein are incorporated by reference in their entirety unless stated otherwise. In the event that there is a plurality of definitions for a term herein, those in this section prevail unless stated otherwise.

As used herein, "polyamine" refers to a compound with 2 or more nitrogen atoms. In some examples, "polyamine" refers to a compound with three nitrogen atoms: one primary nitrogen atom, one secondary nitrogen atom and one tertiary nitrogen atom. Examples of "polyamines" include: 2-piperazine-1-ethylamine (otherwise known as 2-piperazin-1-ylethanamine, amino ethyl piperazine, 1-(2-aminoethyl)piperazine or AEP); 1-(2-hydroxyethyl)piperazine; piperazine; 1,4-diaminocyclohexane; 4-aminopiperidine; 4-amino-1-piperidineethanol; 3-dimethylamino-1-propylamine; N-methylamino-1-propylamine; 3-diethylamino-1-propylamine; and, N-ethylamino-1-propylamine. In the solvents of the presently claimed invention, the "polyamine" acts as an "activator" or "amine promoter", meaning it acts faster to remove gases than the other compound(s) present in the solvent and therefore improves the kinetics of the $CO_2$ absorption of the solvent as a whole.

Some of the example "polyamines" described above are set out in Table 1.

TABLE 1

Examples of "polyamines"

| Name | Abbreviation | Formula | MW/g mol$^{-1}$ | CAS# | Synonyms |
|---|---|---|---|---|---|
| 2-piperazine-1-ethylamine | AEP | $C_6H_{15}N_3$ | 129.21 | 140-31-8 | 2-piperazin-1-ylethanamine; amino ethyl piperazine; 1-(2-aminoethyl)piperazine |
| 1-(2-hydroxyethyl)piperazine | HEP | $C_6H_{14}N_2O$ | 130.19 | 103-76-4 | 2-piperazinoethanol; piperazine-1-ethanol |
| piperazine | PZ | $C_4H_{10}N_2$ | 86.14 | 110-85-0 | 1,4-diazacyclohexane; 1,4-piperazine; hexahydropyrazine; pyrazine hexahydride |
| 1,4-diaminocyclohexane | DACH | $C_6H_{14}N_2$ | 114.19 | 2615-25-0 | 1,4-cyclohexanediamine; 1,4-cyclohexylenediamine; cyclohexane-1,4-diamine; hexahydro-1,4-phenylenediamine |
| 4-amino piperidine | 4-AP | $C_5H_{12}N_2$ | 100.17 | 13035-19-3 | |
| 4-amino-1-piperidineethanol | 4-A-1PE | $C_7H_{16}N_2O$ | 144.22 | 89850-72-6 | 2-(4-amino-1-piperidinyl)ethanol; 2-(4-aminopiperidin-1-yl)ethanol; 2-(4-aminopiperidin-1-yl)ethan-1-ol; 2-(4-amino-piperidin-1-yl)-ethanol |
| 3-dimethylamino-1-propylamine | DMAPA | $C_5H_{14}N_2$ | 102.18 | 109-55-7 | 3-aminopropyldimethylamine; 1-Amino-3-(dimethylamino)propane; (3-aminopropyl)dimethylamine; γ-(dimethylamino)propylamine |
| N-methylamino propylamine | MMAPA | $C_4H_{12}N_2$ | 88.15 | 6291-84-5 | |
| 3-diethylamino propylamine | DEAPA | $C_7H_{18}N_2$ | 130.23 | 104-78-9 | N,N-diethyl-1,3-propanediamine; N,N'-diethyl-1,3-diaminopropane; N,N-diethyltrimethylenediamine |
| N-ethylamino propylamine | MEAPA | $C_5H_{14}N_2$ | 102.18 | 10563-23-2 | 1,3-propanediamine, N-ethyl-; 1-amino-3-(ethylamino)propane; N-Ethyl-1,3-propanediamine |

As used herein, "sterically hindered alkanolamine" refers to a compound with at least one amine group and at least one hydroxyl group, wherein the amine group is bonded to a carbon atom, which carbon atom is itself bonded to three other carbon atoms (i.e. the carbon atom to which the at least one amine group is bonded is itself sterically hindered). In some examples, the amine group is a primary amine or a secondary amine. Examples of "sterically hindered alkanolamines" include: 2-amino-2-ethyl-1,3-propanediol (otherwise known as AEPD); 2-amino-2-hydroxymethyl-1,3-propanediol (otherwise known as AHPD); 2-amino-2-methyl-1,3-propanediol (otherwise known as AMPD); 2-methylamino-2-ethyl-1,3-propanediol (otherwise known as MAEPD); 2-methylamino-2-hydroxymethyl-1,3-propanediol (otherwise known as MAHPD); and, 2-methylamino-2-methyl-1,3-propanediol (otherwise known as MAMPD).

Some of the example "sterically hindered alkanolamine" described above are set out in Table 2.

TABLE 2

Examples of "sterically hindered alkanolamines"

| Name | Abbreviation | Formula | MW | CAS# | Synonyms |
|---|---|---|---|---|---|
| 2-amino-2-ethyl-1,3-propanediol | AEPD | $C_5H_{13}NO_2$ | 119.16 | 115-70-8 | 2-amino-1,3-dihydroxy-2-ethylpropane; 1,3-propanediol, 2-amino-2-ethyl-; 2-amino-2-ethylpropane-1,3-diol |
| 2-amino-2-hydroxymethyl-1,3-propanediol | AHPD | $C_4H_{11}NO_3$ | 121.14 | 77-86-1 | Tris(hydroxymethyl)aminomethane; 1,3-propanediol, 2-amino-2-(hydroxymethyl)-; 2-amino-2-(hydroxymethyl)propan-1,3-diol; Trimethylol Aminomethane |
| 2-amino-2-methyl-1,3-propanediol | AMPD | $C_4H_{11}NO_2$ | 105.14 | 115-69-5 | 1,3-propanediol, 2-amino-2-methyl-; 2-amino-2-methylpropane-1,3-diol; aminomethyl propanediol |
| 2-methylamino-2-ethyl-1,3-propanediol | MAEPD | $C_6H_{15}NO_2$ | 133.19 | 27646-82-8 | 1,3-propanediol, 2-ethyl-2-(methylamino)-; 2-ethyl-2-(methylamino)-1,3-propanediol; |
| 2-methylamino-2-hydroxymethyl-1,3-propanediol | MAHPD | $C_5H_{13}NO_3$ | 135.16 | 74178-02-2 | 1,3-propanediol, 2-(hydroxymethyl)-2-(methylamino)-; 2-(Hydroxymethyl)-2-(methylamino)-1,3-propanediol |
| 2-methylamino-2-methyl-1,3-propanediol | MAMPD | $C_5H_{13}NO2$ | 119.16 | | 1,3-propanediol, 2-methyl-2-(methylamino)-; 2-methyl-2-(methylamino)-1,3-propanediol; 2-methyl-2-(methylamino)propane-1,3-diol |

As used herein, "unavoidable impurities" refers to components present in a mixture in small amounts which have no bearing on the function of the overall mixture. Unavoidable impurities are generally inert and non-reactive. In some examples, "small amounts" refers to less than 5% by weight, or less than 4% by weight, or less than 3% by weight, or less than 2% by weight, or less than 1% by weight, or less than 0.5% by weight.

Where a range of values is provided, it is understood that the upper and lower limit, and each intervening value between the upper and lower limit of the range is encompassed within the examples.

Removing Carbon Dioxide from a Gas Stream

This disclosure relates to a process for removing carbon dioxide from a gas stream by washing the gas stream with an aqueous solution containing, a sterically hindered alkanolamine (for example, 2-amino-2-hydroxymethyl-1,3-propanediol (AHPD) and/or 2-amino-2-ethyl-1,3-propanediol (AEPD)), a polyamine (sometimes referred to as "an activator" in this specification) (for example, 2-piperazine-1-ethylamine and/or piperazine) as an aqueous solution.

Solvent characteristics play a role in both equipment size and process energy requirements when undertaking carbon dioxide capture. In certain circumstances, the following factors can be considered when choosing a solvent:

Cyclic capacity (the difference between $CO_2$ concentration in the solvent leaving an absorber and that leaving a reboiler in a carbon dioxide capture system): a solvent having a high or higher cyclic capacity is desirable since higher cyclic capacity results in a lower reboiler duty, reduced electrical consumption in pumps, and potential downsizing of equipment, which can result in lower investment costs;

Evaporative losses: a carbon capture solvent will have high operational evaporative losses if it exhibits a high vapor pressure. Traditionally, gas treatment processes incorporate a water wash section at the top of the absorber column to mitigate against evaporative losses. The use of a solvent possessing a low vapor pressure is desirable, leading to the reduction in the size of, or even the need for a water wash section.

These properties, namely, $CO_2$ cyclic capacity and vapor pressure, play a significant role in the process design and operation of a gas treating (e.g. a carbon capture) process plant. Generally, absorption solutions with high $CO_2$ loading capacities and low vapor pressures offer low operating cost for a gas treatment processing plant.

The solvents described herein includes a sterically hindered alkanolamine, capable of achieving a high $CO_2$ loading capacity. One specific improvement in the performance of the acid gas cleaning system, relative to prior art utilising aqueous solvents containing 2-amino-2-methyl propanol, relates to the solubility of the amine salts at high $CO_2$ solvent loadings. Solutions containing 2-amino-2-methyl propanol (AMP) at concentrations greater than 25 wt. % tend to precipitate out of solution as a bicarbonate salt, owing to the relative insolubility of the salts, when loaded with high levels of $CO_2$. However, the present inventors discovered that the solubility of the bicarbonate salts of 2-amino-2-hydroxymethyl-1,3-propanediol (otherwise known as AHPD) and 2-amino-2-ethyl-1,3-propanediol (otherwise known as AEPD) in aqueous solution are much greater than in the case of 2-amino-2-methyl propanol solvent mixtures and thus, solutions containing 2-amino-2-hydroxymethyl-1, 3-propanediol (otherwise known as AHPD) and/or 2-amino-2-ethyl-1,3-propanediol (otherwise known as AEPD) were found to offer higher capacity $CO_2$ loading without precipitation. Without wishing to be bound by theory, it is believed that this higher capacity $CO_2$ loading without precipitation is due to the solubility of amine bicarbonate salts in the reaction system.

Whilst the present inventors made this discovery (the solubility of the bicarbonate salts of AHPD and AEPD in aqueous solution are much greater than in the case of 2-amino-2-methyl propanol solvent mixtures) with AHPD and AEPD, it is believed that this discovery also applies to other "sterically hindered alkanolamines", including: 2-amino-2-methyl-1,3-propanediol (otherwise known as AMPD); 2-methylamino-2-ethyl-1,3-propanediol (otherwise known as MAEPD); 2-methylamino-2-hydroxymethyl-1,3-propanediol (otherwise known as MAHPD); and, 2-methylamino-2-methyl-1,3-propanediol (otherwise known as MAMPD).

The solvent described herein includes a sterically hindered alkanolamine for high $CO_2$ loading capacity. To improve the performance of an acid gas cleaning system in comparison with prior art N-methyl diethanolamine (MDEA), which results in relatively low carbon dioxide loading capacity. Significantly higher carbon dioxide loading is observed in aqueous solutions containing 2-amino-2-hydroxymethyl-1,3-propanediol (otherwise known as AHPD) and/or 2-amino-2-ethyl-1,3-propanediol (otherwise known as AEPD) than the prior art solvent technology containing MDEA.

To improve the kinetics of the acid gas cleaning system and deep removal of the acid gas cleaning system such as carbon dioxide, a polyamine (which can be referred to as an "amine activator") (e.g. 2-piperazine-1-ethylamine (otherwise known as AEP)) may be utilised in an aqueous solvent system containing at least one sterically hindered alkanolamine. Other examples of suitable "polyamines" to be included in the solvents of the present invention include: 1-(2-hydroxyethyl)piperazine; piperazine; 1,4-diaminocyclohexane; 4-aminopiperidine; 4-amino-1-piperidineethanol; 3-dimethylamino-1-propylamine; N-methylamino-1-propylamine; 3-diethylamino-1-propylamine; and, N-ethylamino-1-propylamine.

A mixture for absorbing the gases disclosed herein from a gas stream includes; at least one sterically hindered alkanolamine (for example 2-amino-2-hydroxymethyl-1,3-propanediol and/or 2-amino-2-ethyl-1,3-propanediol). This mixture demonstrates an absorption capacity and selectivity suitable for acid gas absorption. Furthermore, the performance of this mixture is beneficial at a relatively high partial pressure of $CO_2$, such as between 1 bar and 50 bar. The liquid/gas ratio of the solvent system disclosed herein may be manipulated, for example at high pressures and/or deep carbon dioxide removal.

The addition of a suitable activator compound (otherwise referred to as a polyamine), for example in relatively smaller amounts than the sterically hindered alkanolamine, allows for more carbon dioxide to be flashed at relatively high pressure as compared to similar, aqueous chemical absorbents known in the art. For example, the addition of AEP results in improved kinetics of the system as compared to systems currently known in the art, thereby resulting in an improvement in the liquid/gas ratio and reduction in the vapor pressure of the solvent system. Further, a deep removal of carbon dioxide may be obtained.

The present disclosure therefore provides a process for removing carbon dioxide, and optionally hydrogen sulphide, from a gas stream by washing the gas stream with an aqueous solution comprising: a sterically hindered alkanolamine (for example, 2-amino-2-hydroxymethyl-1,3- propanediol and/or 2-amino-2-ethyl-1,3-propanediol); and a polyamine (otherwise referred to as an amine activator) (for example, 2-piperazine-1-ethylamine); in an aqueous solution.

The gases to be treated in the process disclosed herein may be a synthesis gas, obtained by, for example, (catalytic) partial oxidation and/or by steam methane reformation of hydrocarbons, for example methane, natural or associated gas, Naphtha, diesel and liquid residual fractions, gases originating from coal/biomass gasification, coke oven gases, refinery gases, hydrogen and hydrogen containing gases, and synthesis gas or natural gas. The process may be carried out at a temperature of from 15° C. to 90° C. Alternatively, the process may be carried out at from 25° C. to 80° C. Alternatively, the process may be carried out from 40° C. to 65° C. The process may also be carried out at a pressure of from 10 bar to 150 bar. Alternatively, the process may be carried out at a pressure of from 15 bar to 90 bar.

The disclosed process may be carried out continuously through regeneration of a loaded solvent. Contact of the gas mixture with the absorbent solvent may be done through any means known in the art. For example, contact of the gas mixture with the absorbent solvent may be carried out in an absorption column having valve trays, bubble cab trays, baffles, and the like, and structured/random packing may also be applied. Changing the solvent/gas ratio may optimize the amount of $CO_2$ removed. The solvent/gas ratio may be from 1.0 to 10.0 (w/w). The loaded solvent may contain, besides $CO_2$ and optionally $H_2S$, appreciable amounts of other compounds from the gas mixture to be purified, such as hydrocarbons, carbon monoxide, hydrogen, and other potential pollutants. These (non-acid) compounds may be removed from the loaded solvent by flashing to a pressure higher than the sum of the partial pressure belonging to the $CO_2$ and optional $H_2S$. In this scenario, small amounts of $CO_2$ and optionally $H_2S$ will be released from the solvent with the (non-acid) compounds. The loaded solvent may also be flashed in a second step to a pressure below the partial pressures of $CO_2$ and optionally $H_2S$ at the prevailing temperature. This flashing may be carried out at a pressure of from 1 bar to 15 bar. Alternatively, this flashing may be carried out at from 1 bar to 10 bar. Alternatively, the flashing may occur at ambient pressure. After flashing, the loaded solvent may be regenerated at a relatively high temperature and at a pressure of from 1 bar to 5 bar. Alternatively, regeneration of the loaded solvent may occur at from 1 bar to 3 bar. The regeneration may be carried out by heating, in a regeneration column, at a temperature of from 70° C. to 150° C. The heating may be carried out with steam or hot oil. The lean absorbent solvent may be used again in the absorption stage. The lean solvent may be heat exchanged with the loaded solvent.

Additionally, the solvent of the presently claimed invention may be able to remove $H_2S$, carbonyl sulphide (COS) and mercaptans from the purification process and may be able to make the aforementioned gas useful for other applications not disclosed herein.

In some embodiments, at least one sterically hindered amine (otherwise referred to as a sterically hindered alkanolamine) such as 2-amino-2-hydroxymethyl-1,3-propanediol and/or 2-amino-2-ethyl-1,3-propanediol is present at from 20 wt. % to 65 wt. % (or to 45 wt. %), and an amine activator (otherwise referred to as a polyamine) such as 2-piperazine-1-ethylamine and/or piperazine is present at from 3 wt. % to 25 wt. %, the balance being water (for example, demineralised water) and unavoidable impurities.

In some embodiments, at least one sterically hindered amine such as 2-amino-2-hydroxymethyl-1,3-propanediol and/or 2-amino-2-ethyl-1,3-propanediol is present at from 30 wt. % to 45 wt. %, and an amine activator (otherwise referred to as a polyamine) such as 2-piperazine-1-ethylamine and/or piperazine is present at from 5 wt. % to 15 wt. %, the balance being water and unavoidable impurities.

In an example, the solvent may have a composition of 40 wt. % 2-amino-2-hydroxymethyl-1,3-propanediol and/or 40 wt. % 2-amino-2-ethyl-1,3-propanediol, and 5 wt. % 2-piperazine-1-ethylamine, the balance being demineralised water and unavoidable impurities.

EXAMPLES

Example 1

TABLE 3

Prior art and present invention for $CO_2$ loading
(mol of $CO_2$ per liter of solvent solution)

| Solvent Components in Weight % (the balance being demineralised water) | $CO_2$ Loading, mol/L ($CO_2$ partial pressure @5 bar, 40 C.) |
|---|---|
| Prior Art (45% MDEA + 5%PZ) | 4.02 |
| Present Invention (45% AEPD + 5% AEP) | 4.70 |
| Prior Art (45% AMP +5% PZ) | N/A (Precipitation occurs) |
| Prior Art (45% AMP +5% AEP) | N/A (Precipitation occurs) |
| 40% AEPD + 10% AEP | 4.73 |
| 10% AHPD | 0.99 |
| 10% AEPD | 0.92 |
| 20% AHPD | 1.93 |
| 20% AEPD | 1.82 |
| 10% AHPD + 10% AEP | 2.00 |
| 10% AEPD + 10% AEP | 1.98 |
| 30% AEPD + 15% AEP | 3.97 |
| 30% AHPD + 15% AEP | 4.18 |
| 25% AEPD + 15% AEP + 10% MDEA | 3.82 |
| 30% AEPD + 10% AEP + 10% MDEA | 4.08 |
| 30% AHPD + 10% AEP + 10% MDEA | 3.97 |
| 30% AEPD + 5% AEP + 15% MDEA | 4.00 |
| 30% AHPD + 15% AEP + 5% MDEA | 4.02 |
| 30% AEPD + 15% AEP + 5% MDEA | 4.20 |

MDEA=N-methyl-diethanolamine
PZ=piperazine
AEPD=2-amino-2-ethyl-1,3-propanediol
AEP=2-piperazine-1-ethylamine
AHPD=2-amino-2-hydroxymethyl-1,3-propanediol
AMP=2-amino-2-methyl propanol Prior Art (45% MDEA+5% PZ) offers a $CO_2$ loading capacity in comparison with present invention (45% AEPD+ 5% AEP).

Prior Art (45% AMP+5% PZ) and/or (45% AMP+5% AEP) on $CO_2$ loading results in a precipitate out of solution as a bicarbonate salt, owing to the relative insolubility of the salts, when loaded with high levels of $CO_2$. The solubility of the bicarbonate salts of the solvents of the present Invention (45% AEPD+5% AEP) does not precipitate out and offers significant high $CO_2$ loading. Therefore, the solvents of the presently claimed invention provide advantages.

Example 2

The presence of 2-amino-2-ethyl-1,3-propanediol (AEPD) provides a relatively low vapor pressure and thus, minimises evaporative vapor solvent losses, when compared to at least a prior art solvent comprising 2-amino-2-methyl propanol.

TABLE 4

Vapor pressures of different compounds

| Alkanolamine | Vapor Pressure, Pa at 20° C. |
|---|---|
| 2-amino-2-ethyl-1,3-propanediol (AEPD) | 2.63E−04 |
| 2-amino-2-methyl propanol (AMP) | 0.045 |

The values in Table 4 are given for the pure components, i.e. not in solution.

Example 3

Figure 2:
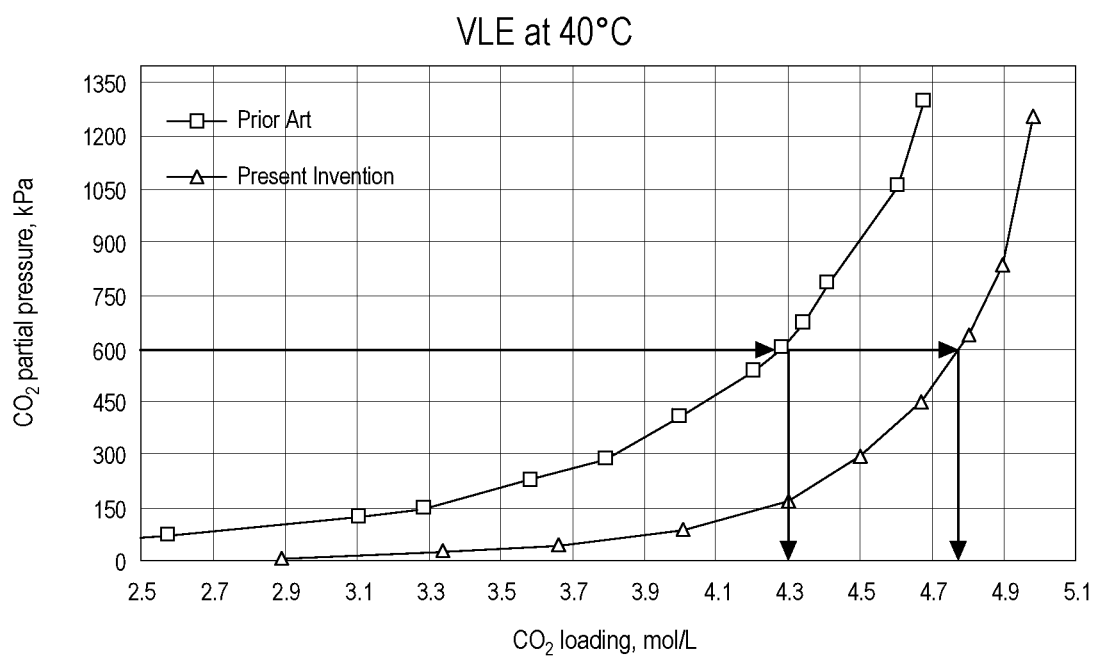
FIG. 2 is a graphical representation illustrating vapor liquid equilibrium (VLE) data at 40° C. of an absorbent solution (i.e. a solvent) of the present invention and an absorbent solution (i.e. a solvent) of the prior art, according to the present disclosure.

FIG. 2 is a graphical representation of the Vapor Liquid Equilibrium data at 40° C. of a prior art solvent and a solvent according to the presently claimed invention. From the graph of FIG. 2, a solvent according to the presently claimed invention has a higher $CO_2$ loading compared to the prior art solvent.

For example, at a $CO_2$ partial pressure of 6 bar (600 kPa) the $CO_2$ loading with the:
  a. Present Invention (45% AEPD+5% AEP): 4.76 mol $CO_2$/L solvent
  b. Prior Art (45% MDEA+5% PZ): 4.30 mol $CO_2$/L solvent
  MDEA=N-methyl-diethanolamine
  PZ=piperazine
  AEPD=2-amino-2-ethyl-1,3-propanediol
  AEP=2-piperazine-1-ethylamine
  In a. and b., the balance is demineralised water.

The solvent according to the present invention (a.) has a significantly higher $CO_2$ loading as a $CO_2$ partial pressure of 6 bar (600 kPa), when compared to the prior art (b.). Therefore, a solvent according to the present invention provides advantages over the prior art.

From Indian Patent Application Number 201811023872 (filed 26 Jun. 2018), the disclosure of which is hereby incorporated by reference in its entirety:

FIG. 1 illustrates a graph showing vapor liquid equilibrium (VLE) relationship between partial pressure of $CO_2$ in the vapor phase and the loading (i.e. concentration) of $CO_2$ in a solvent at 40° C.

TABLE 5 a table showing unloaded (no $CO_2$) solvent viscosity and $CO_2$ loaded solven tviscosity at 40° C.

| | Unloaded | CO2 loaded Viscosity, eP @40 C. | |
|---|---|---|---|
| Solvent | Viscosity, cP @40 C. | CO2 loading, mol/L | Viscosity, cP |
| 40% DEEA + 10% AEP | 4.472 | 2.000 | 12.59 |
| 10% AHPD + 10% AEP | 1.370 | 0.597 | 1.78 |
| 10% AEPD + 10% AEP | 1.470 | 0.658 | 1.86 |

TABLE 5-continued a table showing unloaded (no $CO_2$) solvent viscosity and $CO_2$ loaded solven tviscosity at 40° C.

| | Unloaded | CO2 loaded Viscosity, eP @40 C. | |
|---|---|---|---|
| Solvent | Viscosity, cP @40 C. | CO2 loading, mol/L | Viscosity, cP |
| 30% AEPD + 15% AEP | 3.759 | 2.020 | 8.77 |
| 30% AHPD + 15% AEP | 4.004 | 2.050 | 10.62 |

In Table 5, the components are given in weight %. The balance in each case is demineralised water.
  DEEA=2-(diethylamino)ethanol
  AHPD=2-amino-2-hydroxymethyl-1,3-propanediol
  AEPD=2-amino-2-ethyl-1,3-propanediol
  AEP=2-piperazine-1-ethylamine
  A1. A solvent comprising:
    a tertiary amine (for example, N-methyl-diethanolamine and/or 2-(diethylamino)ethanol), and/or,
    a sterically hindered amine (or sterically hindered alkanolamine) (for example, 2-amino-2-ethyl-1,3-propanediol, 2-amino-2-hydroxymethyl-1,3-propanediol and/or 2-amino-2-methyl-1-propanol), and/or,
    a polyamine (for example, 2-piperazine-1-ethylamine and/or 1-(2-hydroxyethyl)piperazine), and/or,
    a carbonate buffer (for example, potassium carbonate), and/or,
    water (for example, deionised water).
  A2. A solvent according to clause A1, wherein the solvent comprises: an amino hindered alcohol (optionally, amino-2-methyl-1-propanol), a polyamine (optionally, amino ethyl piperazine) and water.

From Indian Patent Application Number 201811024582 (filed 2 Jul. 2018), the disclosure of which is hereby incorporated by reference in its entirety:

An intensified solvent, in some embodiments, comprises: an alkanolamine, a reactive amine and a carbonate buffer. An intensified solvent, in some embodiments, comprises: a tertiary amine (for example, N-methyl-diethanolamine and/or 2-(diethylamino)ethanol), and/or, a sterically hindered amine (or sterically hindered alkanolamine) (for example, 2-amino-2-ethyl-1,3-propanediol, 2-amino-2-hydroxymethyl-1,3-propanediol, 2-methylamino-2-methyl propanol and/or 2-amino-2-methyl-1-propanol), and/or, a polyamine (for example, 2-piperazine-1-ethylamine and/or 1-(2-hydroxyethyl)piperazine), and/or, a carbonate buffer (for example, potassium carbonate), and/or, water (for example, deionised water).

In an example of the invention, the solvent may be an intensified solvent. Optionally, the intensified solvent comprises a tertiary amine, a sterically hindered amine (or sterically hindered alkanolamine), a polyamine, a salt and water. The use of an intensified solvent along with microwave radiation is typically applied to increase the absorption of the microwave radiation by the solvent. An intensified solvent optionally contains water, carbonates, bicarbonates and carbamate salts. A rise in temperature may be observed. Without wishing to be bound by theory, the rise in temperature is caused by the interaction between solvent components and the microwave radiation, resulting in the rotation of dipoles of the solvent components and ionic conduction mechanisms.

Optionally, the tertiary amine in the intensified solvent is one or more of: N-methyl-diethanolamine (MDEA) or 2-(diethylamino)ethanol (DEA). Optionally, the sterically hindered amines (or sterically hindered alkanolamines) in the intensified solvent are one or more of: 2-amino-2-ethyl-1,3-propanediol (AEPD), 2-amino-2-hydroxymethyl-1,3-propanediol (AHPD) or 2-amino-2-methyl-1-propanol (AMP). Optionally, the polyamine in the intensified solvent is one or more of: 2-piperazine-1-ethylamine (AEP) or 1-(2-hydroxyethyl)piperazine. Optionally, the salt in the intensified solvent is potassium carbonate. Optionally, water (for example, deionised water) is included in the solvent so that the solvent exhibits a single liquid phase.

B1. An intensified solvent comprising:
- a tertiary amine (for example, N-methyl-diethanolamine and/or 2-(diethylamino)ethanol), and/or,
- a sterically hindered amine (otherwise referred to as an alkanolamine) (for example, 2-amino-2-ethyl-1,3-propanediol, 2-amino-2-hydroxymethyl-1,3-propanediol and/or 2-amino-2-methyl-1-propanol), and/or,
- a polyamine (for example, 2-piperazine-1-ethylamine and/or 1-(2-hydroxyethyl)piperazine), and/or,
- a carbonate buffer (for example, potassium carbonate), and/or,
- water (for example, deionised water).

B2. The intensified solvent of clause B1, wherein the intensified solvent is a solvent comprising: an alkanolamine, a reactive amine and a carbonate buffer.

B3. The intensified solvent of clause B1 or clause B2, wherein the intensified solvent is free of monoethanolamine.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A process for removal of acid gases from a gaseous mixture, the process comprising:
   obtaining a solvent, the solvent comprising: a polyamine present in an amount from 3% to 25% by weight; a sterically hindered alkanolamine present in an amount from 10% to 65% by weight; the balance being water and unavoidable impurities,
   wherein the polyamine is 2-piperazine-1-ethylamine and the sterically hindered alkanolamine is at least one of: 2-amino-2-ethyl-1,3-propanediol, 2-amino-2-hydroxymethyl-1,3-propanediol, 2-amino-2-methyl-1,3-propanediol, 2-methylamino-2-ethyl-1,3-propanediol, 2-methylamino-2-hydroxymethyl-1,3-propanediol and 2-methylamino-2-methyl-1,3-propanediol; and
   applying the solvent to a gaseous mixture comprising one or more gases selected from the group consisting of: carbon dioxide, mercaptans, hydrogen sulphide, and carbonyl sulphide, thereby obtaining a loaded solvent and a treated gas mixture.

2. The process of claim 1, further comprising:
   heating the loaded solvent to a temperature of from 65° C. to 110° C.

3. The process of claim 1, further comprising:
   loading the loaded solvent into a regeneration column with at least carbon dioxide/acid gas at a regeneration pressure of from 0 bar to 5 bar and at a temperature of from 75° C. to 130° C.

4. The process of claim 1, further comprising:
   heating the loaded solvent to a temperature of from 105° C. to 130° C.

5. The process of claim 1, wherein the gaseous mixture comprises one or more gases present at less than 4 ppm.

6. The process of claim 1, further comprising at least one of:
   a. reducing the concentration of carbon dioxide in the gaseous mixture to less than 100 ppm by volume;
   b. reducing the concentration of $H_2S$ in the gaseous mixture to less than 2 ppm by volume and reducing the concentration of carbon dioxide in the gaseous mixture to less than 50 ppm by volume; and
   c. reducing the concentration of mercaptans in the gaseous mixture to less than 5 ppm by volume.

7. The process of claim 1, further comprising:
   reducing a concentration of carbon dioxide in the gaseous mixture to less than 10 ppm.

8. The process of claim 1, wherein the gaseous mixture is a synthesis gas obtained from a process selected from the group consisting of: a coal gasification process, a steam reforming process, and a direct reduced iron process; each synthesis gas comprising one or more of carbon monoxide, carbon dioxide, hydrogen sulfide, carbonyl sulfide, hydrogen, nitrogen, and methane.

9. The process of claim 1, wherein the gaseous mixture is natural gas comprising methane.

* * * * *